(12) United States Patent
Zhan et al.

(10) Patent No.: US 10,594,218 B1
(45) Date of Patent: Mar. 17, 2020

(54) HYSTERESIS TIMING SCHEME FOR MODE TRANSITION IN A BUCK BOOST CONVERTER

(71) Applicant: RENESAS ELECTRONICS AMERICA INC., Milpitas, CA (US)

(72) Inventors: Xiaodong Zhan, McKinney, TX (US); Prabhjot Singh, San Jose, CA (US); Long Yu, Hangzhou (CN)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/226,482

(22) Filed: Dec. 19, 2018

Related U.S. Application Data

(60) Provisional application No. 62/608,338, filed on Dec. 20, 2017.

(51) Int. Cl.
*H02M 3/158* (2006.01)
*G05F 1/62* (2006.01)
*H02M 3/157* (2006.01)

(52) U.S. Cl.
CPC ............ *H02M 3/1582* (2013.01); *G05F 1/62* (2013.01); *H02M 3/157* (2013.01); *H02M 3/1588* (2013.01)

(58) Field of Classification Search
CPC ...... H02M 3/156; H02M 3/157; H02M 3/158; H02M 3/1582; H02M 3/1588; G05F 1/62
See application file for complete search history.

(56) References Cited

U.S. PATENT DOCUMENTS

| | | | |
|---|---|---|---|
| 7,495,419 B1 | 2/2009 | Ju | |
| 8,232,789 B2 | 7/2012 | Moussaoui | |
| 8,305,055 B2 | 11/2012 | Wu et al. | |
| 8,305,061 B1* | 11/2012 | Zhang | H02M 3/1582 323/259 |
| 8,319,483 B2* | 11/2012 | Fishelov | H02M 3/157 323/271 |
| 8,436,591 B2 | 5/2013 | Dearn | |
| 8,692,533 B2 | 4/2014 | Chen et al. | |
| 8,773,084 B2 | 7/2014 | Casey et al. | |
| 8,896,279 B2* | 11/2014 | Wu | H02M 3/1584 323/259 |
| 9,088,211 B2 | 7/2015 | Ivanov et al. | |
| 9,525,350 B2 | 12/2016 | Hari et al. | |
| 9,614,443 B2 | 4/2017 | Kay et al. | |
| 9,627,975 B2 | 4/2017 | Khlat et al. | |
| 9,660,533 B2 | 5/2017 | Choudhary | |

(Continued)

*Primary Examiner* — Matthew V Nguyen
(74) *Attorney, Agent, or Firm* — Foley & Lardner LLP

(57) ABSTRACT

A buck boost converter includes a buck boost converter circuit to generate an output voltage in response to an input voltage, and a mode control logic circuit to generate a mode control signal to control an operation mode of the buck boost converter circuit to operate in one of a buck mode, a boost mode, and a buck-boost mode. The buck boost converter circuit includes an upper buck transistor coupled to an input voltage node, the input voltage node to receive the input voltage, an upper boost transistor coupled to an output voltage node, the output voltage node to output the output voltage, and an inductor coupled between the upper buck transistor and the upper boost transistor. The mode control signal is generated based on a first duty cycle of the upper buck transistor and a second duty cycle of the upper boost transistor.

20 Claims, 11 Drawing Sheets

(56) References Cited

U.S. PATENT DOCUMENTS

| | | | |
|---|---|---|---|
| 9,882,488 B2 | 1/2018 | Houston | |
| 2011/0006743 A1* | 1/2011 | Fabbro | H02M 3/1582 323/282 |
| 2011/0187336 A1* | 8/2011 | Wu | G05F 1/10 323/282 |
| 2015/0280559 A1* | 10/2015 | Vaidya | H02M 3/1582 323/271 |

* cited by examiner

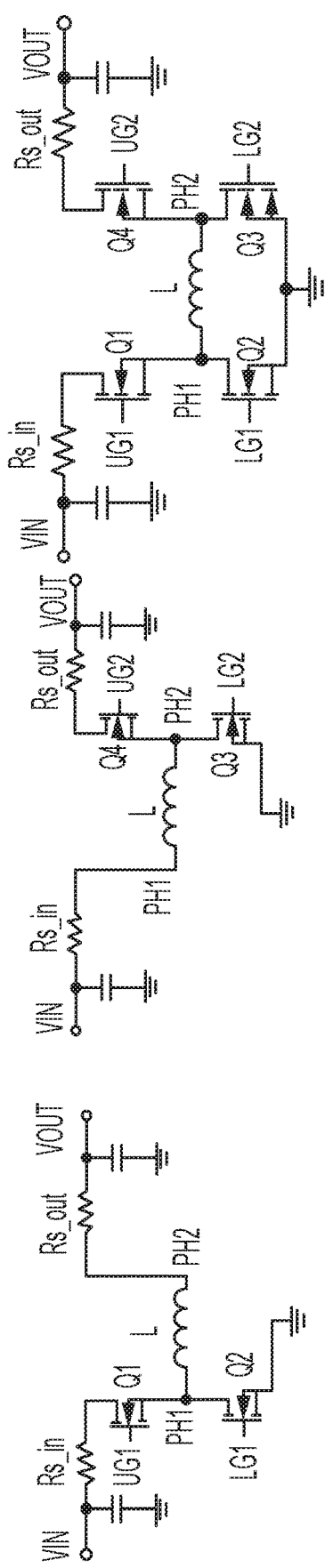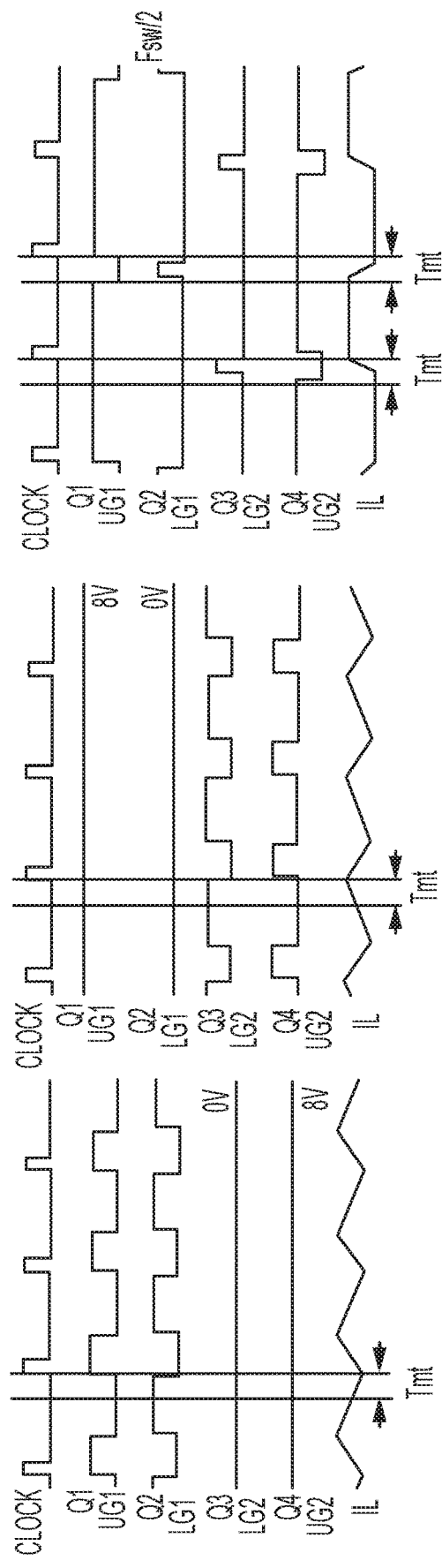
FIG. 4A    FIG. 4B    FIG. 4C

HYSTERESIS TIMING SCHEME FOR MODE TRANSITION IN A BUCK BOOST CONVERTER

CROSS-REFERENCE TO RELATED PATENT APPLICATIONS

This application claims priority to, and the benefit from, U.S. Provisional Application No. 62/608,338, filed on Dec. 20, 2017, which is incorporated herein by reference in its entirety.

TECHNICAL FIELD

The present embodiments relate generally to buck-boost converters, and systems and methods of driving the buck-boost converters.

BACKGROUND

A buck boost converter is a type of DC-DC converter that is capable of providing a positive output voltage that is higher or lower than its input voltage. As battery powered devices are becoming more and more popular, this topology is becoming more attractive as it can make use of the discharge cycles of a battery. When a battery input voltage is higher than its output voltage, a buck boost converter works in the buck mode of operation. In the buck mode of operation, the converter decreases the input voltage to a suitable level for use at its output. When the battery input voltage is lower than the output voltage, the buck boost converter works in the boost mode of operation wherein the input voltage is increased to a suitable level at the output. It is relatively easy to implement the control in either a pure buck mode of operation or a pure boost mode of operation by leaving some power switches turned on or off. The challenge remains in the transition between the buck and boost modes of operation when the output voltage is close to the input voltage. There are two challenges to controlling the buck boost converter during this transition between buck and boost modes of operation. One challenge involves line transients, which is a dynamic response. The other challenge is output ripples wherein the generated input voltage is close to the output voltage which is a steady state performance issue.

SUMMARY

According to an example embodiment, a converter includes: a buck boost converter circuit configured to generate an output voltage in response to an input voltage, the buck boost converter circuit including: an upper buck transistor connected to an input voltage node, the input voltage node configured to receive the input voltage; an upper boost transistor connected to an output voltage node, the output voltage node configured to output the output voltage; and an inductor connected between the upper buck transistor and the upper boost transistor; and a mode control logic circuit configured to generate a mode control signal to control an operation mode of the buck boost converter circuit to operate in one of a buck mode, a boost mode, and a buck-boost mode. The mode control signal is generated based on a first duty cycle of the upper buck transistor and a second duty cycle of the upper boost transistor.

In some embodiments, the mode control logic circuit may be configured to compare the first duty cycle of the upper buck transistor with a first transition time duty cycle when the buck boost converter circuit is operating in the buck mode.

In some embodiments, the mode control logic circuit may be configured to generate the mode control signal to switch the operation mode of the buck boost converter circuit from the buck mode to a boost cycle within the buck-boost mode in response to the first duty cycle of the upper buck transistor exceeding the first transition time duty cycle.

In some embodiments, the mode control logic circuit may be configured to compare the second duty cycle of the upper boost transistor with a second transition time duty cycle in response to the buck boost converter circuit operating in the boost cycle within the buck-boost mode, the second transition time duty cycle being less than the first transition time duty cycle.

In some embodiments, the mode control logic circuit may be configured to generate the mode control signal to switch the operation mode of the buck boost converter circuit from the boost cycle within the buck-boost mode to a buck cycle within the buck-boost mode in response to the second duty cycle of the upper boost transistor being greater than the second transition time duty cycle.

In some embodiments, the mode control logic circuit may be configured to generate the mode control signal to switch the operation mode of the buck boost converter circuit from the buck-boost mode to the boost mode after executing at least two consecutive boost cycles in response to the second duty cycle of the upper boost transistor being less than the second transition time duty cycle.

In some embodiments, the mode control logic circuit may be configured to compare the second duty cycle of the upper boost transistor with the first transition time duty cycle when the buck boost converter circuit is operating in the boost mode.

In some embodiments, the converter may further include: a buck mode control logic driver configured to generate a first gate control signal for the upper buck transistor responsive to the mode control signal; and a boost mode control logic driver configured to generate a second gate control signal for the upper boost transistor responsive to the mode control signal.

In some embodiments, the converter may further include a PWM controller configured to provide a buck PWM control signal to the buck mode control logic driver, and to provide a boost PWM control signal to the boost mode control logic driver.

In some embodiments, the buck boost converter circuit may further include: a lower buck transistor connected between the upper buck transistor and ground; and a lower boost transistor connected between the upper boost transistor and ground. When the buck boost converter circuit is operating in the buck-boost mode: the buck mode control logic driver may be configured to alternately switch the upper buck transistor and the lower buck transistor on and off, responsive to the mode control signal and the buck PWM control signal; and the boost mode control logic driver may be configured to alternately switch the upper boost transistor and the lower boost transistor on and off, responsive to the mode control signal and the boost PWM control signal.

According to another example embodiment, a method of driving a converter is provided, the converter including: a buck boost converter circuit configured to generate an output voltage in response to an input voltage, the buck boost converter circuit including: an upper buck transistor connected to an input voltage node, the input voltage node configured to receive the input voltage; an upper boost transistor connected to an output voltage node, the output voltage node configured to output the output voltage; and an inductor connected between the upper buck transistor and the upper boost transistor; and a mode control logic circuit configured to generate a mode control signal to control an operation mode of the buck boost converter circuit to operate in one of a buck mode, a boost mode, and a buck-boost mode. The method includes: comparing, by the mode control logic circuit, a first duty cycle of the upper buck transistor with a first transition time duty cycle when the buck boost converter circuit is operating in the buck mode; comparing, by the mode control logic circuit, a second duty cycle of the upper boost transistor with the first transition time duty cycle when the buck boost converter circuit is operating in the boost mode; and comparing, by the mode control logic circuit, the first duty cycle of the upper buck transistor and the second duty cycle of the upper boost transistor with a second transition time duty cycle when the buck boost converter circuit is operating in the buck-boost mode, the second transition time duty cycle being less than the first transition time duty cycle.

In some embodiments, the method may further include: generating, by the mode control logic circuit, the mode control signal to switch the operation mode of the buck boost converter circuit from the buck mode to a boost cycle within the buck-boost mode in response to the first duty cycle of the upper buck transistor exceeding the first transition time duty cycle.

In some embodiments, the method may further include: comparing, by the mode control logic circuit, the second duty cycle of the upper boost transistor with the second transition time duty cycle in response to the buck boost converter circuit operating in the boost cycle within the buck-boost mode.

In some embodiments, the method may further include: generating, by the mode control logic circuit, the mode control signal to switch the operation mode of the buck boost converter circuit from the boost cycle within the buck-boost mode to a buck cycle within the buck-boost mode in response to the second duty cycle of the upper boost transistor being greater than the second transition time duty cycle.

In some embodiments, the method may further include: executing, by the buck boost converter circuit, at least two consecutive boost cycles in response to the second duty cycle of the upper boost transistor being less than the second transition time duty cycle; and generating, by the mode control logic circuit, the mode control signal to switch the operation mode of the buck boost converter circuit from the buck-boost mode to the boost mode after the at least two consecutive boost cycles are executed.

In some embodiments, the method may further include: generating, by the mode control logic circuit, the mode control signal to switch the operation mode of the buck boost converter circuit from the boost mode to a buck cycle within the buck-boost mode in response to the second duty cycle of the upper boost transistor exceeding the first transition time duty cycle.

In some embodiments, the method may further include: comparing, by the mode control logic circuit, the first duty cycle of the upper buck transistor with the second transition time duty cycle in response to the buck boost converter circuit operating in the buck cycle within the buck-boost mode.

In some embodiments, the method may further include: generating, by the mode control logic circuit, the mode control signal to switch the operation mode of the buck boost converter circuit from the buck cycle within the buck-boost mode to a boost cycle within the buck-boost mode in response to the first duty cycle of the upper buck transistor being greater than the second transition time duty cycle.

In some embodiments, the method may further include: executing, by the buck boost converter circuit, at least two consecutive buck cycles in response to the second duty cycle of the upper buck transistor being less than the second transition time duty cycle; and generating, by the mode control logic circuit, the mode control signal to switch the operation mode of the buck boost converter circuit from the buck-boost mode to the buck mode after the at least two consecutive buck cycles are executed.

In some embodiments, the method may further include: generating, by the mode control logic circuit, the mode control signal for the buck-boost mode by outputting the mode control signal corresponding to one cycle of a buck mode alternating with one cycle of a boost mode repeatedly until at least one of the first duty cycle of the upper buck transistor and the second duty cycle of the upper boost transistor decreases below the second transition time duty cycle; and generating, by the mode control logic circuit, the mode control signal for one of the buck mode and the boost mode in response to the first duty cycle of the upper buck transistor or the second duty cycle of the upper boost transistor being decreased below the second transition time duty cycle.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 4A-4C illustrate waveform diagrams for driving the buck boost converter of FIG. 3 in various modes, according to some embodiments;

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art.

One or more embodiments of the present disclosure relate to mode transition schemes to control buck boost converters, and to methods of driving the buck boost converters to achieve a smooth transition between modes while reducing ripple voltage, ripple current, and/or output voltage ripple noise and variation. According to various embodiments, the converter is configured to operate in a pure buck mode, a pure boost mode, and a buck-boost mode, including between transitions from buck mode to boost mode or boost mode to buck mode. In the buck-boost mode, the converter locks in one cycle of buck (or boost) mode followed by one cycle of boost (or buck) mode that alternate until two consecutive buck or boost cycles appear, in which case the converter exits the buck-boost mode. In some embodiments, the converter is driven based on hysteresis of one or more transition time duty cycles, resulting in clean mode transitions while reducing (or avoiding) chattering during the transitions.

Figure 1:
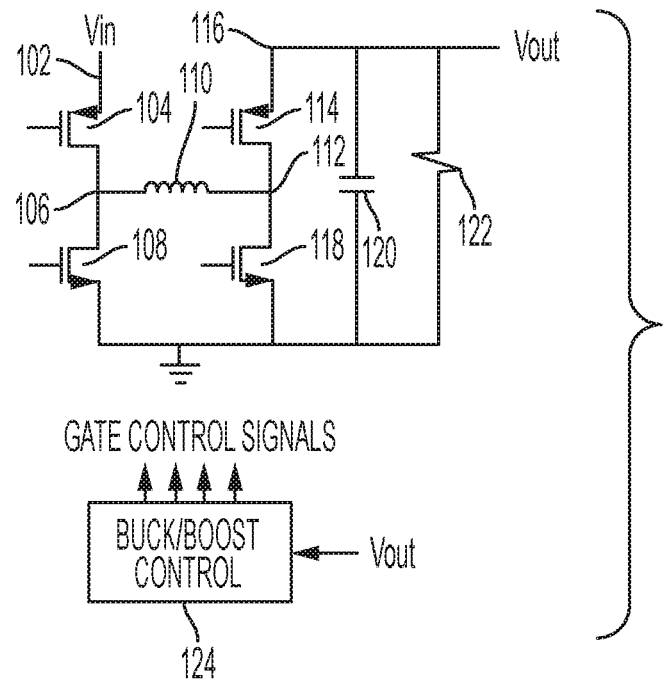
FIG. 1 is a schematic diagram of a buck boost converter.

Referring now to the drawings, and more particularly to FIG. 1, there is illustrated a schematic diagram of a buck boost converter. The buck boost converter includes an input voltage node 102 into which an input voltage VIN is applied. A high side buck transistor 104 comprises a P-channel transistor having its source/drain path connected between node 102 and node 106. A low side buck transistor 108 comprises an N-channel transistor having its drain/source path connected between node 106 and ground. An inductor 110 is connected between node 106 and node 112. A high side P-channel boost transistor 114 has its source/drain path connected between an output voltage node VOUT 116 and node 112. A low side boost transistor 118 comprises an N-channel transistor having its source/drain path connected between node 112 and ground. An output capacitor 120 is connected between the output voltage node 116 and ground. An output load resistor 122 is connected in parallel with the capacitor 120 between node 116 and ground. Each of the high side buck transistor 104, low side buck transistor 108, high side boost transistor 114, and low side boost transistor 118 have gates connected to a buck boost control circuit 124. The buck boost control circuit 124 generates gate control signals via a plurality of outputs using internal control logic responsive to at least a level of the output voltage VOUT applied from node 116. The duty cycle in the buck mode of operation is defined as $D=t_{on(104)}/T$, where $t_{on(104)}$ is the on-time of switching transistor 104 and T is the switching period of the converter. The switching period T of the converter is defined as the inverse of the switching frequency fsw (e.g., T=1/fsw). On the other hand, during boost operation, the duty cycle is defined to be $D=t_{on(114)}/T$, where $t_{on(114)}$ is the on-time of synchronous high side boost transistor 114 divided by the switching period T of the converter.

Figure 2:
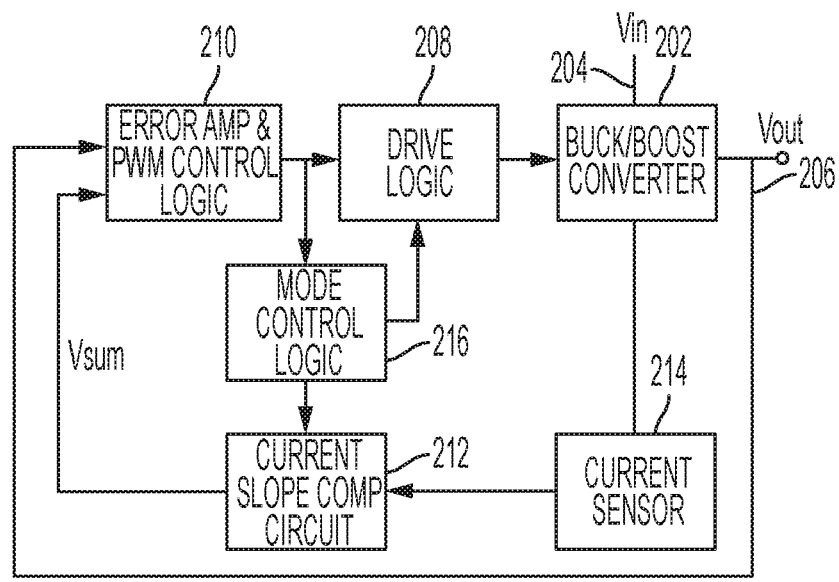
FIG. 2 illustrates a functional block diagram of a buck boost converter, according to some embodiments.

Referring now to FIG. 2, there is illustrated a functional block diagram of a buck boost converter operating according to some embodiments of the present disclosure. The buck boost converter circuitry 202 receives the input voltage VIN at input node 204 and provides the output voltage VOUT at the node 206. Switching transistors within the buck boost converter 202 are driven according to drive control signals provided from drive logic 208. The drive logic 208 generates the drive control signals to the switching transistors responsive to PWM control signals provided from PWM control logic 210. The Error amplifier and PWM control logic 210 generates the PWM control signals responsive to the output voltage monitored at node 206 and also responsive to the current control voltage Vsum provided from current slope control compensation logic 212. The current slope control compensation logic generates the Vsum voltage to the Error amplifier and PWM control logic 210 responsive to a monitored current within the buck boost converter 202 provided by a current sensor 214 and mode control logic 216. The current sensor 214 measures the input current provided at the input node 204 of the buck boost converter 202. The mode control logic 216 determines whether the buck boost converter 202 is operating in the buck mode of operation, the boost mode of operation, or the buck-boost mode of operation by monitoring the PWM signals provided from the PWM control logic 210. The mode control logic 216 additionally provides mode control signals to the drive logic 208 to control the operation of the switching transistors within the buck boost converter 202.

Figure 3:
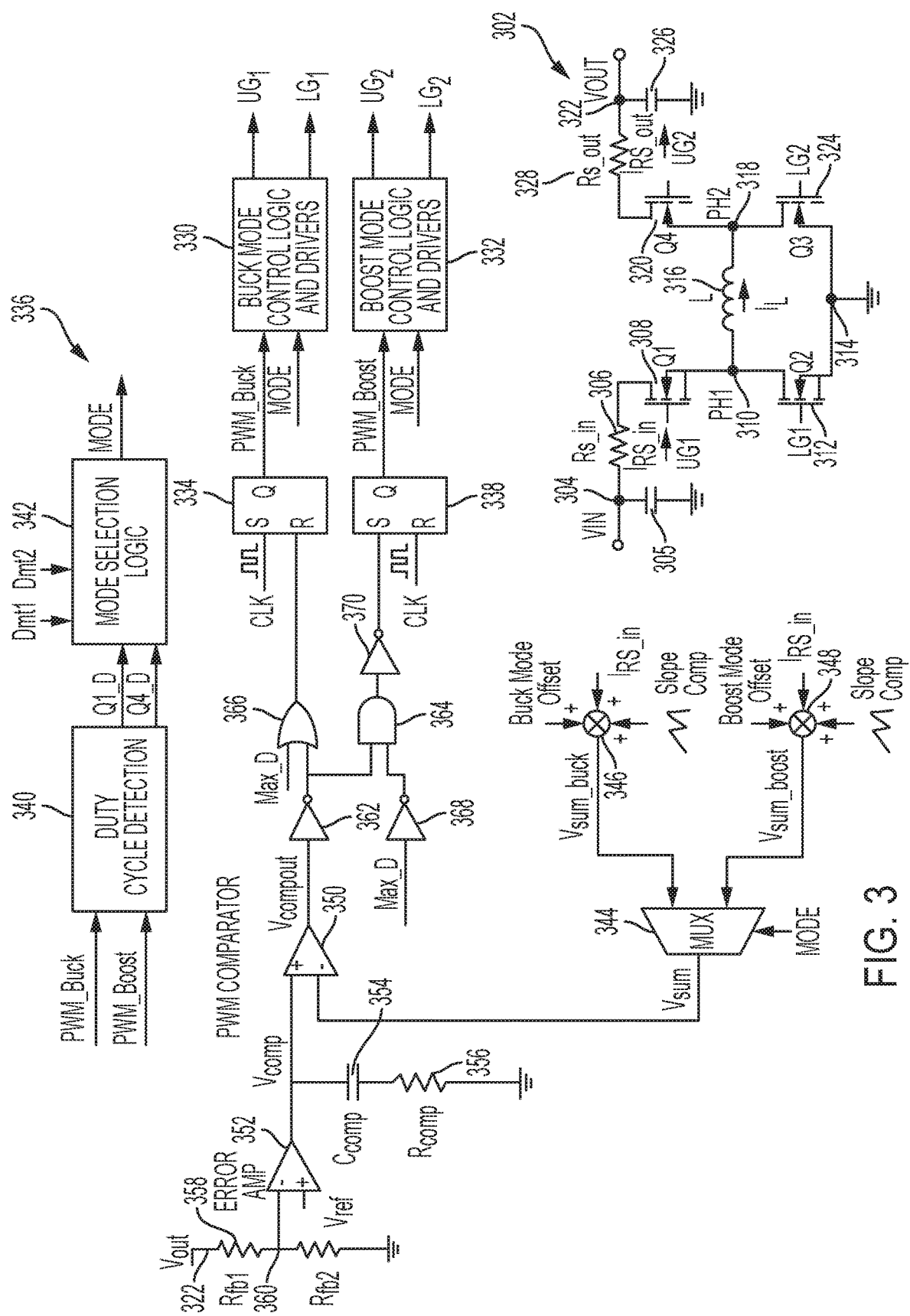
FIG. 3 provides a more detailed block diagram of the buck boost converter shown in FIG. 2, according to some embodiments.

Referring now to FIG. 3, there is illustrated a block diagram of a buck boost converter, according to some embodiments of the present disclosure. The buck boost converter 302 includes an input voltage node 304 to which the input voltage VIN is applied. An input current sensor (e.g., a resistor Rs_in) 306 senses the input voltage current through node 304 and provides a sensed input current $I_{Rs\_in}$. The sensed input current $I_{Rs\_in}$ is the same as the inductor current when the upper buck transistor (Q1) is in on state. An input capacitor 305 is connected between the input voltage node 304 and ground (or a ground node 314). An upper buck transistor (Q1) 308 is connected between the input current sensor 306 and node 310 to have its drain/source path connected between the input current sensor 306 and the node 310. A gate of the upper buck transistor (Q1) 308 is connected to receive a first upper gate drive signal UG1. A lower buck transistor (Q2) 312 is connected between a node (PH1) 310 and the ground node 314 to have its drain/source path connected between the node 310 and the ground node 314. A gate of the lower buck transistor (Q2) 312 is connected to receive a first lower gate drive signal LG1. An inductor (L) 316 is connected between the node 310 and a node (PH2) 318. In various embodiments, each of the upper buck transistor (Q1) 308 and the lower buck transistor (Q2) 312 may be an N-channel transistor (e.g. N-type power MOSFET), but the present disclosure is not limited thereto, and in other embodiments, each of the upper buck transistor (Q1) 308 and the lower buck transistor (Q2) 312 may be any suitable kind of transistor.

An upper boost transistor (Q4) 320 is connected to the node 318 to have its drain/source path connected between an output current sensor (e.g., a resistor Rs_out) 328 and the node 318. A gate of the upper boost transistor (Q4) 320 is connected to receive a second upper gate drive signal UG2. The output current sensor 328 is connected between the upper boost transistor (Q4) 320 and an output voltage node 322. The output current sensor 328 senses the output voltage current through the node 322 and provides a sensed output current $I_{Rs\_out}$. An output capacitor 326 is connected between the node 322 and ground (or the ground node 314). A lower boost transistor (Q3) 324 is connected to the node 318 to have its drain/source path connected between the node 318 and the ground node 314. A gate of the lower boost transistor (Q3) 324 is connected to receive a second lower gate drive signal LG2. In various embodiments, each of the upper boost transistor (Q4) 320 and the lower boost transistor (Q3) 324 may be an N-channel transistor (e.g. N-type power MOSFET), but the present disclosure is not limited thereto, and in other embodiments, each of the upper boost transistor (Q4) 320 and the lower boost transistor (Q3) 324 may be any suitable kind of transistor.

The gate drive signals UG1, LG1, UG2, and LG2 for each of the upper buck transistor (Q1) 308, the lower buck transistor (Q2) 312, the upper boost transistor (Q4) 320, and the lower boost transistor (Q3) 324 are provided from the buck mode control logic and drivers 330 and the boost mode control logic and drivers 332. The buck mode control logic and drivers 330 generates the first upper gate drive signal UG1 to control the upper buck transistor (Q1) 308 and the first lower gate drive signal LG1 to control the lower buck transistor (Q2) 312 in response to a PWM signal PWM_Buck provided from SR latch 334 and a mode control signal MODE provided from the mode control logic 336. The boost mode control logic and drivers 332 generates the second upper gate drive signal UG2 to control the upper boost transistor (Q4) 320 and the second lower gate drive signal LG2 to control the lower boost transistor (Q3) 324 in response to a PWM control signal PWM_Boost provided from SR latch 338 and the mode control signal MODE provided from the mode control logic 336.

The upper buck transistor (Q1) 308 and the lower buck transistor (Q2) 312 are the power switches for operating the buck boost converter 302 in the buck mode of operation. In the buck mode of operation, the upper boost transistor (Q4) 320 is controlled to maintain a turned on state and the lower boost transistor (Q3) 324 is controlled to maintain a turned off state. Likewise, the upper boost transistor (Q4) 320 and the lower boost transistor (Q3) 324 are the power switches for operating the buck boost converter 302 in the boost mode of operation. In the boost mode of operation, the upper buck transistor (Q1) 308 is controlled to maintain a turned on state and the lower buck transistor (Q2) 312 is controlled to maintain a turned off state. In the buck-boost mode of operation, each of the upper buck transistor (Q1) 308, the lower buck transistor (Q2) 312, the upper boost transistor (Q4) 320, and the lower boost transistor (Q3) 324, are the power switches for operating the buck boost converter 302 in the buck-boost mode of operation.

The SR latch 334 provides the buck PWM signal PWM_Buck from the Q output of the SR latch 334 to the buck mode control logic and drivers 330. The SR latch 334 generates the buck PWM signal PWM_Buck in response to a clock signal provided at the S input of the SR latch 334 and a logic signal applied to the R input of the SR latch 334. The SR latch 338 provides the boost PWM signal PWM_Boost from the Q output of the SR latch 338 to the boost mode control logic and drivers 332. The SR latch 338 generates the boost PWM signal PWM_Boost in response to a clock signal provided at the R input of the SR latch 338 and a logic signal applied to the S input of the SR latch 338.

The mode control logic 336 provides the mode control signal MODE to each of the buck mode control logic and drivers 330 and the boost mode control logic and drivers 332. The mode control logic 336 generates the mode control signal MODE in response to the PWM_Buck and PWM_Boost signals provided from the Q outputs of the SR latches 334 and 338, respectively. In this case, in some embodiments, the mode control logic 336 includes a duty cycle detection circuit 340 and a mode selection logic 342. The duty cycle detection circuit 340 generates a Q1 duty signal Q1_D and a Q4 duty signal Q4_D. The duty cycle detection circuit 340 provides the Q1_D signal and the Q4_D signal to the mode selection logic 342 to generate the mode control signal MODE. In some embodiments, the duty cycle detection circuit 340 generates the Q1_D signal corresponding to the duty cycle of the upper buck transistor (Q1) 308 responsive to the PWM_Buck signal (e.g., Q1_D is equal to the duty cycle of the PWM_Buck signal), and provides the Q1_D signal to the mode selection logic 342. In some embodiments, the duty cycle detection circuit 340 generates the Q4_D signal corresponding to the duty cycle of the upper boost transistor (Q4) 320 responsive to the PWM_Boost signal (e.g., Q4_D is equal to 1 minus the duty cycle of the PWM_Boost signal), and provides the Q4_D signal to the mode selection logic 342.

In some embodiments, the mode selection logic 342 determines whether the buck boost converter 302 operates in (or switches to) either the buck mode of operation, the boost mode of operation, or the buck-boost mode of operation. In some embodiments, the mode selection logic 342 generates the mode control signal MODE to control the operation mode of the buck boost converter 302 responsive to the Q1_D signal and the Q4_D signal. For example, in order to smoothly switch from the buck mode of operation to the buck-boost mode of operation, from the buck-boost mode of operation to the buck mode of operation, from the boost mode of operation to the buck-boost mode of operation, or from the buck-boost mode of operation to the boost mode of operation, the mode selection logic 342 compares the Q1_D signal and the Q4_D signal with one or more transition time duty cycles Dmt (e.g., Dmt1 and Dmt2). In some embodiments, the mode control signal MODE generated by the mode selection logic 342 acts like a multiplexer control signal to select the operational circuits, e.g., current sensing and switch driver control logic depending on whether the converter 302 is in the buck mode of operation, the boost mode of operation, or the buck-boost mode of operation. Thus, the mode control signal MODE selects the buck mode control logic drivers 330, the boost mode control logic and drivers 332, or both, depending upon the mode of operation, and also selects an output compensated inductor current signal Vsum provided from the output of a multiplexer 344.

For example, in the buck mode of operation, the mode control signal MODE may select the buck mode control logic and drivers 330 to generate the first upper gate drive signal UG1 and the first lower gate drive signal LG1 to switch the upper buck transistor (Q1) 308 and the lower buck transistor (Q2) 312 via PWM switching. Similarly, in the boost mode of operation, the mode control signal MODE may select the boost mode control logic and drivers 332 to generate the second upper gate drive signal UG2 and the second lower gate drive signal LG2 to switch the upper boost transistor (Q4) 320 and the lower boost transistor (Q3) 324 via PWM switching. On the other hand, in the buck-boost mode of operation, the mode control signal MODE may alternately select the buck mode control logic and drivers 330 and the boost mode control logic and drivers 332 to generate the gate drive signals UG1, LG1, UG2, and LG2 to selectively switch the upper buck transistor (Q1) 308, the lower buck transistor (Q2) 312, the upper boost transistor (Q4) 320, and the lower boost transistor (Q3) 324 via 4-switch PWM switching. For example, in the buck-boost mode of operation, the mode control signal MODE may select the buck mode control logic and drivers 330 to perform one cycle of the buck mode operation, followed by selecting the boost mode control logic and drivers 332 to perform one cycle of the boost mode operation, followed by one cycle of buck mode operation, followed by one cycle of boost mode operation, and so on, until two consecutive boost mode cycles or buck mode cycles are selected.

In some embodiments, the multiplexer 344 is connected to receive either a Vsum_buck compensated inductor current signal or a Vsum_boost compensated inductor current signal. The Vsum_buck compensated inductor current signal includes a summation of the sensed current $I_{Rs\_in}$ from the input current sensor 306, a buck mode offset signal, and a buck slope compensation signal, which are added together by adder circuit 346. In this case, the effective portion of the sensed current $I_{Rs\_in}$ represents the up ramp of the current in inductor 316, which is used for peak current mode control in buck mode implemented by comparator 350. Similarly, the Vsum_boost compensated inductor current signal is generated by an adder circuit 348 by summing together the sensed current $I_{Rs\_in}$ from the input current sensor 306, a boost mode offset signal, and a boost slope compensation signal. The effective portion of the sensed current $I_{Rs\_in}$ represents the down ramp of the current in inductor 316, which is used for valley current mode control in boost mode implemented by comparator 350. The sensed current $I_{Rs\_in}$ from the input current sensor 306 is summed with the buck mode offset or the boost mode offset to ensure that error amplifier 352 is operating with a proper DC bias. The buck or boost compensation slope is added to the sensed current $I_{Rs\_in}$ to avoid sub-harmonic oscillation in large duty cycle operations. While FIG. 3 shows that the Vsum_buck compensated inductor current signal and the Vsum_boost compensated inductor current signal are generated by adding the sensed current $I_{Rs\_in}$ from the input current sensor 306 by the adder circuits 346 and 348, respectively, the present disclosure is not limited thereto. For example, in other embodiments, at least one of the Vsum_buck compensated inductor current signal and the Vsum_boost compensated inductor current signal may be generated by adding the sensed current $I_{Rs\_out}$ from the output current sensor 328.

In some embodiments, each of the Vsum_buck and Vsum_boost compensated inductor current signals are provided to an input of the multiplexer 344. Depending on whether the buck boost converter 302 is operating in the buck mode of operation, the boost mode of operation, or the buck-boost mode of operation, either the Vsum_buck (buck mode) or the Vsum_boost (boost mode) are selected responsive to the MODE signal at the multiplexer 344, and the selected signal is provided as the output compensated inductor current signal Vsum. In some embodiments, in the buck-boost mode of operation, the Vsum_buck compensated inductor current signal and the Vsum_boost compensated inductor current signal are alternately provided as the output compensated inductor current signal Vsum responsive to the MODE signal at the multiplexer 344.

In some embodiments, the output compensated inductor current signal Vsum is provided to an inverting input of a PWM comparator 350 from the multiplexer 344. A non-inverting input of the PWM comparator 350 is connected to receive a voltage error signal VCOMP from an error amplifier 352. An output of the error amplifier 352 is connected to ground through a capacitor (Ccomp) 354 in series with a resistor (Rcomp) 356. An inverting input of the error amplifier 352 monitors the output voltage VOUT at node 322 through a resistor divider including a resistor (Rfb1) 358 connected between the output node 322 and a node 360, and a resistor Rfb2 connected between the node 360 and ground. The inverting input of error amplifier 352 is connected to the node 360. A reference voltage VREF is applied to a non-inverting input of the error amplifier 352. The error amplifier 352 compares the reference voltage VREF with the output voltage VOUT from the buck boost converter 302 to generate the voltage error signal VCOMP. The voltage error signal VCOMP is used to determine an inductor current $I_L$ through the inductor 316 in a peak current mode when the buck boost converter 302 is operating in the buck mode of operation, a valley current mode when the buck boost converter 302 is operating in the boost mode of operation, and a one cycle peak current mode buck followed by one cycle valley current mode boost alternating operation mode when the buck boost converter 302 is operating in the buck-boost mode of operation. Buck operation and boost operation share the same voltage error signal VCOMP. The comparison of Vsum from the output of multiplexer 344 with the voltage error signal VCOMP determines the duty cycle of the PWM_Buck and PWM_Boost signals, and thus, the on/off state of the transistors 308, 312, 320, and 324.

An output VCOMPOUT of the PWM comparator 350 is provided as an input to an inverter 362. The output of the inverter 362 is provided to a first input of an OR gate 366 and to a first input of an AND gate 364. The other input of the OR gate 366 is connected to receive a maximum duty signal MAX_D. In some embodiments, the MAX_D signal may be a fixed signal that is used to remove narrow positive and negative pulses in the output of the inverter 362. The output of the OR gate 366 provides the logic signal to the R input of the SR latch 334 to enable the generation of the PWM_Buck signal. The other input of the AND gate 364 is connected to an output of an inverter 368. The input of the inverter 368 is connected to receive the MAX_D signal. The output of the AND gate 364 is connected to another inverter 370. The output of the inverter 370 provides the logic signal to the S input of the SR latch 338 to enable the generation of the PWM_Boost signal.

Referring now to FIGS. 4A-4C, waveform diagrams are shown for driving the buck boost converter 302 of FIG. 3 in various modes, according to some embodiments. More specifically, FIG. 4A shows a waveform diagram for driving the buck boost converter 302 in the buck mode, FIG. 4B shows a waveform diagram for driving the buck boost converter 302 in the boost mode, and FIG. 4C shows a waveform diagram for driving the buck boost converter 302 in the buck-boost mode.

Referring to FIG. 4A, in the buck mode, the upper boost transistor (Q4) 320 receives the second upper gate drive signal UG2 having a level (e.g., an on level) that is sufficient to maintain the upper boost transistor (Q4) 320 in an on state, and the lower boost transistor (Q3) 324 receives the second lower gate drive signal LG2 having a level (e.g., an off level) that is sufficient to maintain the lower boost transistor (Q3) 324 in an off state. In the buck mode, the output voltage VOUT is controlled (e.g., bucked) by alternately switching on and off the upper buck transistor (Q1) 308 and the lower buck transistor (Q2) 312 via PWM switching. Thus, in the buck mode, the upper buck transistor (Q1) 308 is alternately switched on and off via the first upper gate drive signal UG1, and the lower buck transistor (Q2) 312 is alternately switched on and off via the first lower gate drive signal LG1. The first upper gate drive signal UG1 and the first lower gate drive signal LG1 are provided by the buck mode control logic and drivers 330 in response to the mode control signal MODE and the PWM_Buck signal. In some embodiments, when the on time of the lower buck transistor (Q2) 312 or the off time of the upper buck transistor (Q1) 308 is greater than a transition time Tmt, or when the duty cycle Q1_D of the upper buck transistor (Q1) 308 is less than the one or more transition time duty cycles Dmt, the buck boost converter 302 operates (or remains) in the buck mode in the next cycle.

Referring to FIG. 4B, in the boost mode, the upper buck transistor (Q1) 308 receives the first upper gate drive signal UG1 having a level (e.g., an on level) that is sufficient to maintain the upper buck transistor (Q1) 308 in an on state, and the lower buck transistor (Q2) 312 receives the first lower gate drive signal LG1 having a level (e.g., an off level) that is sufficient to maintain the lower buck transistor (Q2) 312 in an off state. In the boost mode, the output voltage VOUT is controlled (e.g., boosted) by alternately switching on and off the upper boost transistor (Q4) 320 and the lower boost transistor (Q3) 324 via PWM switching. Thus, in the boost mode, the upper boost transistor (Q4) 320 is alternately switched on and off via the second upper gate drive signal UG2, and the lower boost transistor (Q3) 324 is alternately switched on and off via the second lower gate drive signal LG2. The second upper gate drive signal UG2 and the second lower gate drive signal LG2 are provided by the boost mode control logic and driver 332 in response to the mode control signal MODE and the PWM_Boost signal. In some embodiments, when the on time of the lower boost transistor (Q3) 324 or the off time of the upper boost transistor (Q4) 320 is greater than the transition time Tmt. or when the duty cycle Q4_D of the upper boost transistor (Q4) 320 is less than the one or more transition time duty cycles Dmt, the buck boost converter 302 operates (or remains) in the boost mode in the next cycle.

Referring to FIG. 4C, in the buck-boost mode, each of the upper buck transistor (Q1) 308, the lower buck transistor (Q2) 312, the upper boost transistor (Q4) 320, and the lower boost transistor (Q3) 324 are switched on and off via 4-switch PWM switching. Thus, the upper buck transistor (Q1) 308 is alternately switched on and off via the first upper gate drive signal UG1, and the lower buck transistor (Q2) 312 is alternately switched on and off via the first lower gate drive signal LG1, which are provided by the buck mode control logic and drivers 330 responsive to the mode control signal MODE and the PWM_Buck signal. Similarly, the upper boost transistor (Q4) 320 is alternately switched on and off via the second upper gate drive signal UG2 and the lower boost transistor (Q3) 324 is alternately switched on and off via the second lower gate drive signal LG2, which are provided by the boost mode control logic and drivers 332 responsive to the mode control signal MODE and the PWM_Boost signal.

In some embodiments, when the on time of the lower boost transistor (Q3) 324 or the off time of the upper boost transistor (Q4) 320 is less than the transition time Tmt, or when the duty cycle Q4_D of the upper boost transistor (Q4) 320 is greater than the one or more transition time duty cycles Dmt (e.g., Dmt1 or Dmt2), the buck boost converter 302 operates in (or switches to) the buck mode in the next cycle. On the other hand, in some embodiments, when the on time of the lower buck transistor (Q2) 312 or the off time of the upper buck transistor (Q1) 308 is less than the transition time Tmt. or when the duty cycle Q1_D of the upper buck transistor (Q1) 308 is greater than the one or more transition time duty cycles Dmt, the buck boost converter 302 operates in (or switches to) the boost mode in the next cycle. In some embodiments, in the buck-boost mode, the buck boost converter 302 alternately operates in one buck cycle (or boost cycle) followed by one boost cycle (or buck cycle), and so on, until 2 consecutive buck cycles or boost cycles appear, in which case the buck boost converter 302 exits the buck-boost mode.

Figure 5:
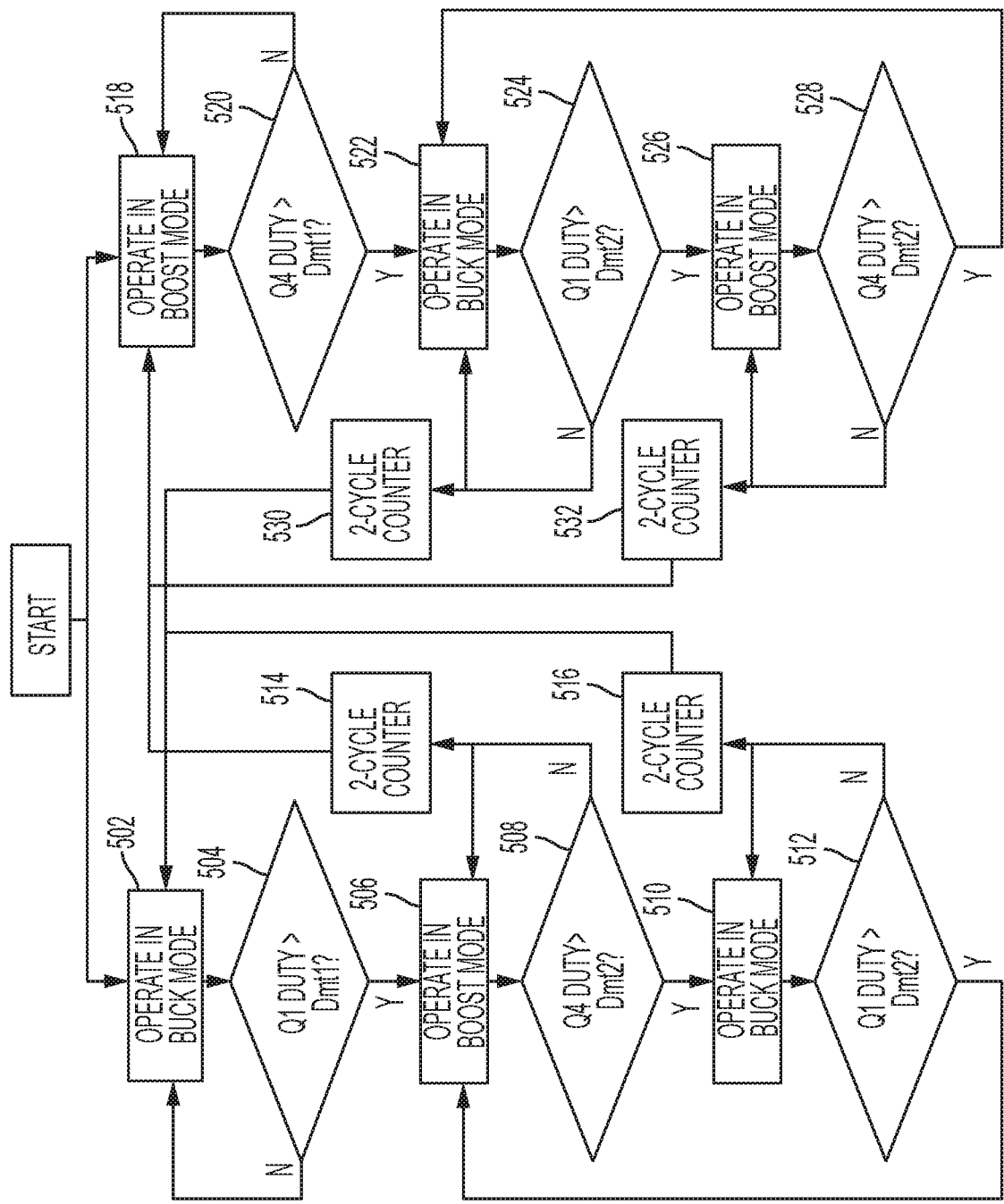
FIG. 5 is a flow diagram of a process of operating the buck boost converter of FIG. 3, according to some embodiments.

FIG. 5 is a flow diagram of a process of operating the buck boost converter of FIG. 3, according to some embodiments. Referring to FIGS. 3-5, the process starts and the converter 302 operates in either the buck mode of operation at block 502 or the boost mode of operation at block 518. When operating in the buck mode of operation at block 502, the duty cycle Q1_D of the upper buck transistor (Q1) 308 is monitored at block 504 to determine if the duty cycle Q1_D is greater than a first transition time duty cycle Dmt1. In some embodiments, the first transition time duty cycle Dmt1 sets an enter duty threshold of the buck-boost mode, and may be close to (e.g., equal to or substantially equal to) the maximum duty signal Max_D. In this case, in some embodiments, the maximum duty signal Max_D is determined by the minimum off time Tmin_off of Q1 or Q4. That is, in some embodiments, Max_D=1−Tmin_off/T, where T is the switching period determined by the clock signal CLK shown in FIG. 3. The minimum off time Tmin_off of Q1 or Q4 may be used to ensure the safe operation of the control logic and drivers 330 and 332. Accordingly, the first transition time duty cycle Dmt1 may be set to be slightly less than Max_D (e.g., Dmt1=98% of Max_D). If the duty cycle Q1_D of the upper buck transistor (Q1) 308 is less than (or not greater than) the first transition time duty cycle Dmt1 at block 504, then the buck boost converter 302 remains in the buck mode of operation at block 502. On the other hand, if the duty cycle Q1_D of the upper buck transistor (Q1) 308 is greater than the first transition time duty cycle Dmt1 at block 504, then the buck boost converter 302 enters (or operates in) a buck-boost mode (e.g., one cycle buck (or boost) followed by one cycle boost (or buck)) of operation. For example, the converter operates in the boost mode (e.g., the boost cycle) of the buck-boost mode of operation at block 506.

When operating in the buck-boost mode of operation (e.g., one cycle buck (or boost) followed by one cycle boost (or buck)), the duty cycles Q1_D and Q4_D are compared with the second transition time duty cycle Dmt2. In some embodiments, the second transition time duty cycle Dmt2 sets an exit duty threshold of the buck-boost mode, and may be less than the first transition time duty cycle Dmt1. For example, the second transition time duty cycle Dmt2 may be set to 70% of the first transition time duty cycle Dmt1, but the present disclosure is not limited thereto. In this case, if the duty cycles Q1_D and Q4_D are greater than the second transition time duty cycle Dmt2, the converter 302 remains in the buck-boost mode of operation (e.g., one cycle buck (or boost) followed by one cycle boost (or buck)). On the other hand, if one of the duty cycles Q1_D and Q4_D becomes less than (or not greater than) the second transition time duty cycle Dmt2, the converter 302 exits the buck-boost mode of operation and transitions to a buck mode or boost mode of operation as the case may be.

For example, when operating in the boost mode (e.g., the boost cycle) of the buck-boost mode of operation at block 506, the duty cycle Q4_D of the upper boost transistor (Q4) 320 is monitored at block 508 to determine if the duty cycle Q4_D is greater than the second transition time duty cycle Dmt2. If the duty cycle Q4_D of the upper boost transistor (Q4) 320 is greater than the second transition time duty cycle Dmt2 at block 508, the converter 302 operates in (or switches to) the buck mode (e.g., the buck cycle of the buck-boost mode) of operation at block 510. On the other hand, if the duty cycle Q4_D of the upper boost transistor (Q4) 320 is less than (or not greater than) the second transition time duty cycle Dmt2 at block 508, the converter 302 operates (or remains) in the boost mode (e.g., the boost cycle) of the buck-boost mode of operation at block 506. The 2-cycle counter 514 counts the two consecutive boost cycles, and the converter 302 exits the buck-boost mode (e.g., one cycle buck (or boost) followed by one cycle boost (or buck)) and enters an inter boost mode operation at block 518.

Similarly, when operating in the buck mode (e.g., the buck cycle) of the buck-boost mode of operation at block 510, the duty cycle Q1_D of the upper buck transistor (Q1) 308 is monitored at block 512 to determine if the duty cycle Q1_D is greater than the second transition time duty cycle Dmt2. If the duty cycle Q1_D of the upper buck transistor (Q1) 308 is greater than the second transition time duty cycle Dmt2 at block 512, the converter 302 operates in (or switches to) the boost mode (e.g., the boost cycle) of the buck-boost mode of operation at block 506, then continues to monitor the duty cycle Q4_D of the upper boost transistor (Q4) 320 at block 508. On the other hand, if the duty cycle Q1_D of the upper buck transistor (Q1) 308 is less than (or not greater than) the second transition time duty cycle Dmt2 at block 512, the converter 302 operates (or remains) in the buck mode (e.g., the buck cycle) of the buck-boost mode of operation at block 510. The 2-cycle counter 516 counts the two consecutive buck cycles, and the converter 302 exits the buck-boost mode (e.g., one cycle buck (or boost) followed by one cycle boost (or buck)) and enters into a buck mode of operation at block 502.

Still referring to FIGS. 3-5, when operating in the boost mode of operation at block 518, the duty cycle Q4_D of the upper boost transistor (Q4) 320 is monitored at block 520 to determine if the duty cycle Q4_D is greater than the first transition time duty cycle Dmt1. If the duty cycle Q4_D of the upper boost transistor (Q4) 320 is less than (or not greater than) the first transition time duty cycle Dmt1 at block 520, then the buck boost converter 302 remains in the boost mode of operation at block 518. On the other hand, if the duty cycle Q4_D of the upper boost transistor (Q4) 320 is greater than the first transition time duty cycle Dmt1 at block 520, then the buck boost converter 302 operates in (or switches to) the buck mode (e.g., the buck cycle) of the buck-boost mode of operation at block 522.

When operating in the buck mode (e.g., the buck cycle) of the buck-boost mode of operation at block 522, the duty cycle Q1_D of the upper buck transistor (Q1) 308 is monitored at block 524 to determine if the duty cycle Q1_D is greater than the second transition time duty cycle Dmt2. If the duty cycle Q1_D of the upper buck transistor (Q1) 308 is greater than the second transition time duty cycle Dmt2 at block 524, the converter 302 operates in (or switches to) the boost mode (e.g., the boost cycle) of the buck-boost mode of operation at block 526. On the other hand, if the duty cycle Q1_D of the upper buck transistor (Q1) 308 is less than (or not greater than) the second transition time duty cycle Dmt2 at block 524, the converter 302 operates (or remains) in the buck mode (e.g., the buck cycle) of the buck-boost mode of operation at block 522. The 2-cycle counter 530 counts the two consecutive buck cycles, and the converter 302 exits the buck-boost mode (e.g., one cycle buck (or boost) followed by one cycle boost (or buck)) and enters the buck mode of operation at block 502.

Similarly, when operating in the boost mode (e.g., the boost cycle) of the buck-boost mode of operation at block 526, the duty cycle Q4_D of the upper boost transistor (Q4) 320 is monitored at block 528 to determine if the duty cycle Q4_D is greater than the second transition time duty cycle Dmt2. If the duty cycle Q4_D of the upper boost transistor (Q4) 320 is greater than the second transition time duty cycle Dmt2 at block 528, the converter 302 operates in (or switches to) the buck mode (e.g., the buck cycle) of the buck-boost mode of operation at block 522, then continues to monitor the duty cycle Q1_D of the upper buck transistor (Q1) 308 at block 524. On the other hand, if the duty cycle Q4_D of the upper boost transistor (Q4) 320 is less than (or not greater than) the second transition time duty cycle Dmt2 at block 528, the converter 302 operates (or remains) in the boost mode (e.g., the boost cycle) of the buck-boost mode of operation at block 526. The 2-cycle counter 532 counts the two consecutive boost cycles, and the converter 302 exits the buck-boost mode (e.g., one cycle buck (or boost) followed by one cycle boost (or buck)) and enters into a boost mode of operation at block 518.

Accordingly, in some embodiments, once the buck boost converter 302 operates (or enters) the buck-boost mode, the buck boost converter 302 alternately operates in one buck cycle (or boost cycle) followed by one boost cycle (or buck cycle), and so on, until 2 consecutive buck cycles or boost cycles appear. Once 2 consecutive buck cycles or boost cycles appear, the buck boost converter 302 exits the buck-boost mode and operates in the buck mode of operation or the boost mode of operation as the case may be.

In some embodiments, the hysteresis of first and second transition time duty cycles Dmt1 and Dmt2 may improve (or guarantee) clean mode transitions and reduce (or avoid) chattering during the transitions. In some embodiments, low frequency output voltage and/or inductor current ripple in the buck-boost mode may be reduced (or eliminated). Accordingly, in various embodiments, the buck boost converter 302 may ensure a clean, smooth, and fast transition between buck mode, buck-boost mode, and boost mode, while reducing output voltage ripple noise and variation during the transitions.

Figure 6A:
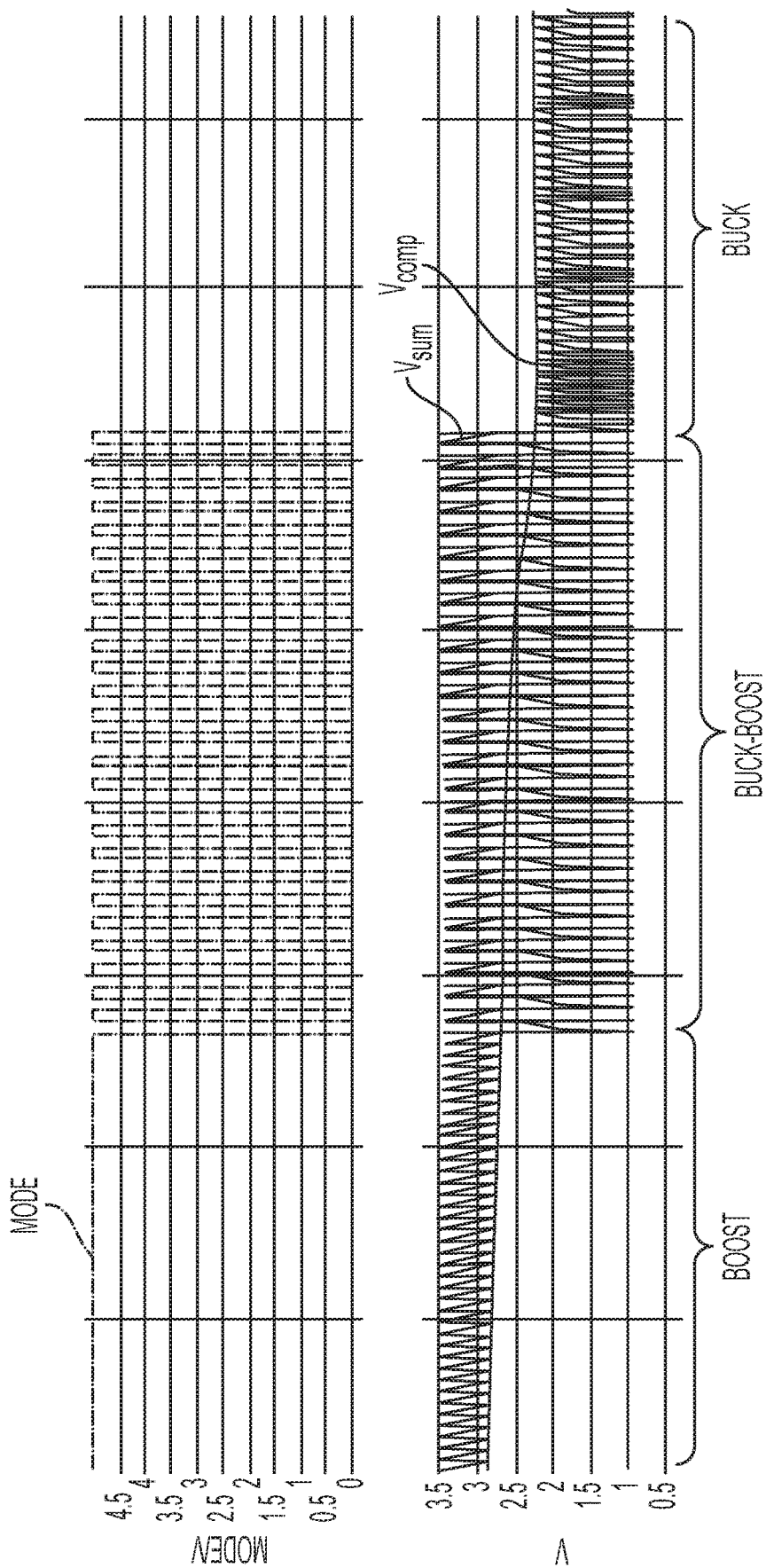
FIGS. 6A and 6B illustrate various waveforms corresponding to mode transition control based on a mode control signal, according to some embodiments.
Figure 6B:
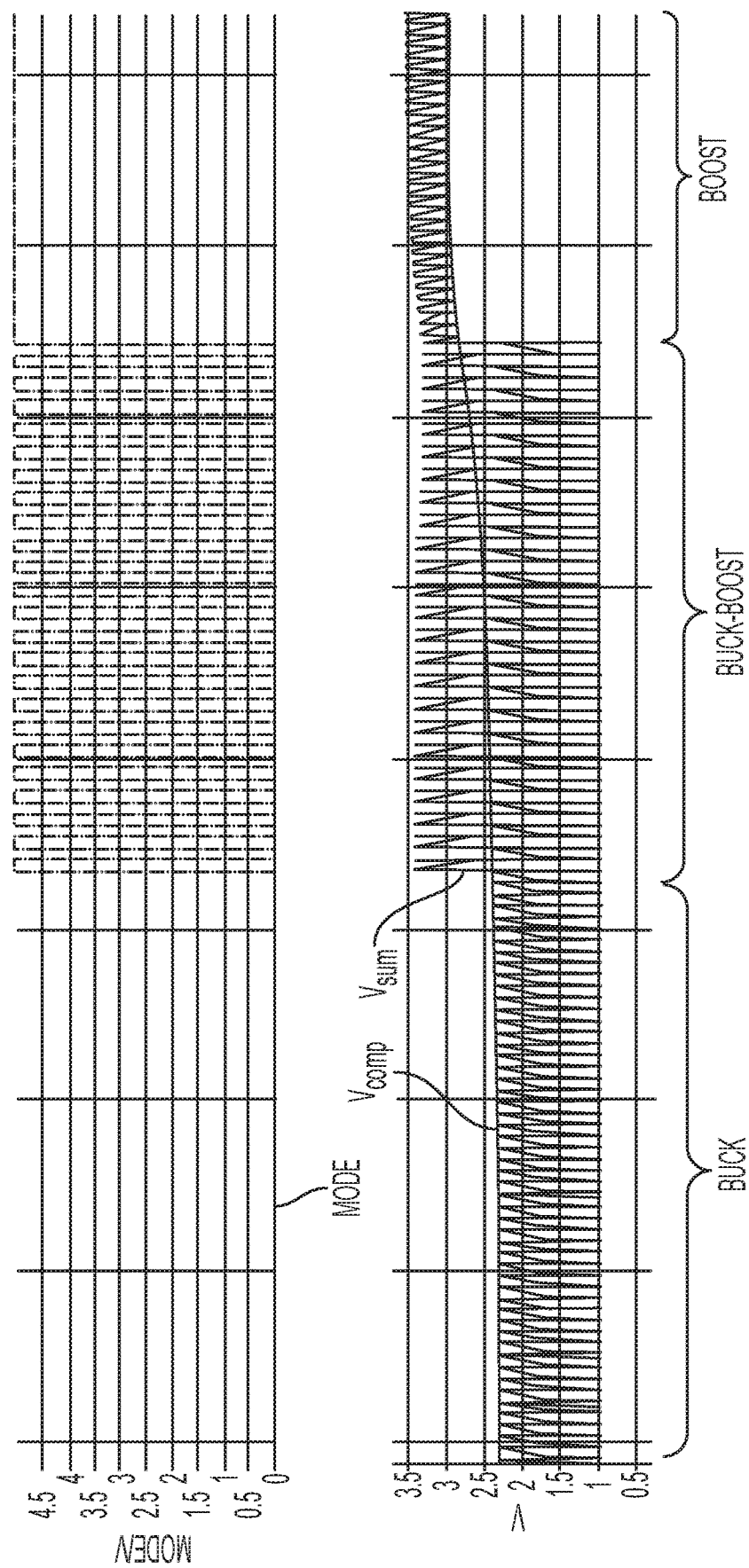

For example, referring now to FIGS. 6A and 6B, various waveforms are shown corresponding to simulation results of controlling mode transitions based on the mode control signal MODE, according to some embodiments. FIG. 6A shows a mode control signal MODE generated to control the transition from a boost mode to a buck-boost mode, and from the buck-boost mode to a buck mode. FIG. 6A also shows the corresponding error signal VCOMP generated from the error amplifier 352 and the corresponding output compensated inductor current signal Vsum generated from the multiplexer 344 as a result of each of the mode transitions. FIG. 6B shows a mode control signal MODE generated to control the transition from a buck mode to a buck-boost mode, and from the buck-boost mode to a boost mode. FIG. 6B also shows the corresponding error signal VCOMP generated from the error amplifier 352 and the corresponding output compensated inductor current signal Vsum generated from the multiplexer 344 as a result of each of the mode transitions.

Referring to FIGS. 3, 4B, 5, and 6A, in some embodiments, when the mode selection logic 342 generates the mode selection signal MODE having a logic "high" level (e.g., 5V), the converter 302 operates in the boost mode. In response to the mode selection signal MODE indicating the boost mode operation, the boost mode control logic and drivers 332 is selected to generate the second upper gate drive signal UG2 and the second lower gate drive signal LG2 to alternately switch on and off the upper boost transistor (Q4) 320 and the lower boost transistor (Q3) 324 according to the PWM_Boost signal. Further, in response to the mode selection signal MODE indicating the boost mode of operation, the buck mode control logic and drivers 330 concurrently (e.g., simultaneously) generates the first upper gate drive signal UG1 having a level sufficient to maintain the upper buck transistor (Q1) 308 in an on state, and the first lower gate drive signal LG1 having a level sufficient to maintain the lower buck transistor (Q2) 312 in an off state.

While operating in the boost mode, the mode selection logic 342 monitors the duty cycle signal Q4_D to determine if the Q4_D signal is greater than the first transition time duty cycle Dmt1 as discussed with reference to FIG. 5. If the Q4_D signal is less than (or not greater than) the first transition time duty cycle Dmt1, then the mode selection logic 342 continues to generate the mode selection signal MODE at the logic "high" level so that the converter 302 maintains the boost mode of operation for the next cycle. On the other hand, when the mode selection logic 342 determines that the Q4_D signal is greater than the first transition time duty cycle Dmt1, the mode selection logic 342 generates the mode control signal MODE to have a logic "low"

level (e.g., 0V) so that the converter 302 transitions to a buck-boost mode (e.g., a buck cycle within the buck-boost mode).

Initially, when operating in the boost mode with a lower input voltage VIN, the duty cycle Q4_D of the upper boost transistor (Q4) 320 is lower than the first transition time duty cycle Dmt1, since Q4_D=VIN/VOUT in the boost mode. Thus, the converter 302 maintains the boost mode. As the input voltage VIN increases to a level close to the output voltage VOUT, the duty cycle Q4_D of the upper boost transistor (Q4) 320 increases until Q4_D is greater than the first transition time duty cycle Dmt1 (see block 520 in FIG. 5).

In response to the duty cycle Q4_D being greater than the first transition time duty cycle Dmt1, the mode selection logic 342 generates the mode control signal MODE to switch the operation mode to a buck cycle within a buck-boost mode. When initially transitioning to the buck-boost mode from the boost mode, the input voltage VIN is still relatively close to the output voltage VOUT, and thus, the duty cycles Q1_D and Q4_D of the upper buck transistor (Q1) 308 and the upper boost transistor (Q4) 320 are greater than the second transition time duty cycle Dmt2 (where Dmt2<Dmt1). Thus, after one buck cycle of the buck-boost mode is performed, the mode selection logic 342 generates the mode control signal MODE to switch the operation mode to a boost cycle of the buck-boost mode, since Q1_D is greater than the second transition time duty cycle Dmt2. The mode selection logic 342 generates the mode control signal MODE to alternately switch the operation mode between one buck cycle and one boost cycle (and thus, 4-switch PWM switching), until one of the duty cycles Q1_D and Q4_D of the upper buck transistor (Q1) 308 and the upper boost transistor (Q4) 320 become less than the second transition time duty cycle Dmt2. For example, as shown in FIG. 6A, after some time switching between one buck cycle and one boost cycle, the duty cycle Q1_D becomes less than the second transition time duty cycle Dmt2 (see 524 in FIG. 5). Thus, in response, the mode selection logic 342 generates the mode control signal MODE having the logic "low" level to switch the operation mode to the buck mode.

When operating in the buck mode, the buck mode control logic and drivers 330 is selected to generate the first upper gate drive signal UG1 and the first lower gate drive signal LG1 to alternately switch on and off the upper buck transistor (Q1) 308 and the lower buck transistor (Q2) 312 according to the PWM_Buck signal. Further, in response to the mode selection signal MODE indicating the buck mode of operation, the boost mode control logic and drivers 332 concurrently (e.g., simultaneously) generates the second upper gate drive signal UG2 having a level sufficient to maintain the upper boost transistor (Q4) 320 in an on state, and the second lower gate drive signal LG2 having a level sufficient to maintain the lower boost transistor (Q3) 324 in an off state. While operating in the buck mode, the mode selection logic 342 monitors the duty cycle signal Q1_D to determine if the Q1_D signal is greater than the first transition time duty cycle Dmt1 as discussed with reference to FIG. 5.

Still referring to FIG. 6A, in the boost mode, the output compensated inductor current signal Vsum generated by the multiplexer 344 remains above the voltage error signal VCOMP generated by the error amplifier 352. As the voltage error signal VCOMP decreases, the duty cycle signal Q4_D increases to a level greater than the first transition time duty cycle Dmt1, and thus, the operation mode transitions to the buck-boost mode. In the buck-boost mode, the voltage error signal VCOMP continues to decrease until the duty cycle signal Q1_D decreases to a level less than the second transition time duty cycle Dmt2, and thus, the operation mode transitions to the buck mode. In the buck mode, the output compensated inductor current signal Vsum remain below the voltage error signal VCOMP. Thus, as shown in FIG. 6A, there is a clean, smooth, and fast transition from boost mode to buck-boost mode, and from buck-boost mode to buck mode.

Referring to FIGS. 3, 4A, 5, and 6B, in some embodiments, when the mode selection logic 342 generates the mode selection signal MODE having a logic "low" level (e.g., 0V), the converter 302 operates in the buck mode. In response to the mode selection signal MODE indicating the buck mode operation, the buck mode control logic and drivers 330 is selected to generate the first upper gate drive signal UG1 and the first lower gate drive signal LG1 to alternately switch on and off the upper buck transistor (Q1) 308 and the lower buck transistor (Q2) 312 according to the PWM_Buck signal. Further, in response to the mode selection signal MODE indicating the buck mode of operation, the boost mode control logic and drivers 332 concurrently (e.g., simultaneously) generates the second upper gate drive signal UG2 having a level sufficient to maintain the upper boost transistor (Q4) 320 in an on state, and the second lower gate drive signal LG2 having a level sufficient to maintain the lower boost transistor (Q3) 324 in an off state.

While operating in the buck mode, the mode selection logic 342 monitors the duty cycle signal Q1_D to determine if the Q1_D signal is greater than the first transition time duty cycle Dmt1 as discussed with reference to FIG. 5. If the Q1_D signal is less than (or not greater than) the first transition time duty cycle Dmt1, then the mode selection logic 342 continues to generate the mode selection signal MODE at the logic "low" level so that the converter 302 maintains the buck mode of operation for the next cycle. On the other hand, when the mode selection logic 342 determines that the Q1_D signal is greater than the first transition time duty cycle Dmt1, the mode selection logic 342 generates the mode control signal MODE to have a logic "high" level (e.g., 5V) so that the converter 302 transitions to a buck-boost mode (e.g., a boost cycle within the buck-boost mode).

Initially, when operating in the buck mode with a higher input voltage VIN, the duty cycle Q1_D of the upper buck transistor (Q1) 308 is lower than the first transition time duty cycle Dmt1, since Q1_D=VOUT/VIN. As the input voltage VIN decreases to a level close to the output voltage VOUT, the duty cycle Q1_D of the upper boost transistor (Q1) 308 increases until Q1_D is greater than the first transition time duty cycle Dmt1 (see block 504 in FIG. 5).

In response to the duty cycle Q1_D being greater than the first transition time duty cycle Dmt1, the mode selection logic 342 generates the mode control signal MODE to switch the operation mode to a boost cycle within a buck-boost mode. When initially transitioning to the buck-boost mode from the buck mode, the input voltage VIN is still relatively close to the output voltage VOUT, and thus, the duty cycles Q1_D and Q4_D of the upper buck transistor (Q1) 308 and the upper boost transistor (Q4) 320 are greater than the second transition time duty cycle Dmt2 (where Dmt2<Dmt1). Thus, after one boost cycle of the buck-boost mode is performed, the mode selection logic 342 generates the mode control signal MODE to switch the operation mode to a buck cycle of the buck-boost mode, since Q4_D is greater than the second transition time duty cycle Dmt2.

The mode selection logic 342 generates the mode control signal MODE to alternately switch the operation mode between one boost cycle and one buck cycle (and thus, 4-switch PWM switching), until one of the duty cycles Q1_D and Q4_D of the upper buck transistor (Q1) 308 and the upper boost transistor (Q4) 320 become less than the second transition time duty cycle Dmt2. For example, as shown in FIG. 6B, after some time switching between one boost cycle and one buck cycle, the duty cycle Q4_D becomes less than the second transition time duty cycle Dmt2 (see 508 in FIG. 5). Thus, in response, the mode selection logic 342 generates the mode control signal MODE having the logic "high" level to switch the operation mode to the boost mode.

When operating in the boost mode, the boost mode control logic and drivers 332 is selected to generate the second upper gate drive signal UG2 and the second lower gate drive signal LG2 to alternately switch on and off the upper boost transistor (Q4) 320 and the lower boost transistor (Q3) 324 according to the PWM_Boost signal. Further, in response to the mode selection signal MODE indicating the boost mode of operation, the buck mode control logic and drivers 330 concurrently (e.g., simultaneously) generates the first upper gate drive signal UG1 having a level sufficient to maintain the upper buck transistor (Q1) 308 in an on state, and the first lower gate drive signal LG1 having a level sufficient to maintain the lower buck transistor (Q2) 312 in an off state. While operating in the boost mode, the mode selection logic 342 monitors the duty cycle signal Q4_D to determine if the Q4_D signal is greater than the first transition time duty cycle Dmt1 as discussed with reference to FIG. 5.

Still referring to FIG. 6B, in the buck mode, the output compensated inductor current signal Vsum generated by the multiplexer 344 remains below the voltage error signal VCOMP generated by the error amplifier 352. As the voltage error signal VCOMP increases, the duty cycle signal Q1_D increases to a level greater than the first transition time duty cycle Dmt1, and thus, the operation mode transitions to the buck-boost mode. In the buck-boost mode, the voltage error signal VCOMP continues to increase until the duty cycle signal Q4_D decreases to a level less than the second transition time duty cycle Dmt2, and thus, the operation mode transitions to the boost mode. In the boost mode, the output compensated inductor current signal Vsum remain above the voltage error signal VCOMP. Thus, as shown in FIG. 6B, there is a clean, smooth, and fast transition from buck mode to buck-boost mode, and from buck-boost mode to boost mode.

Figure 7A:
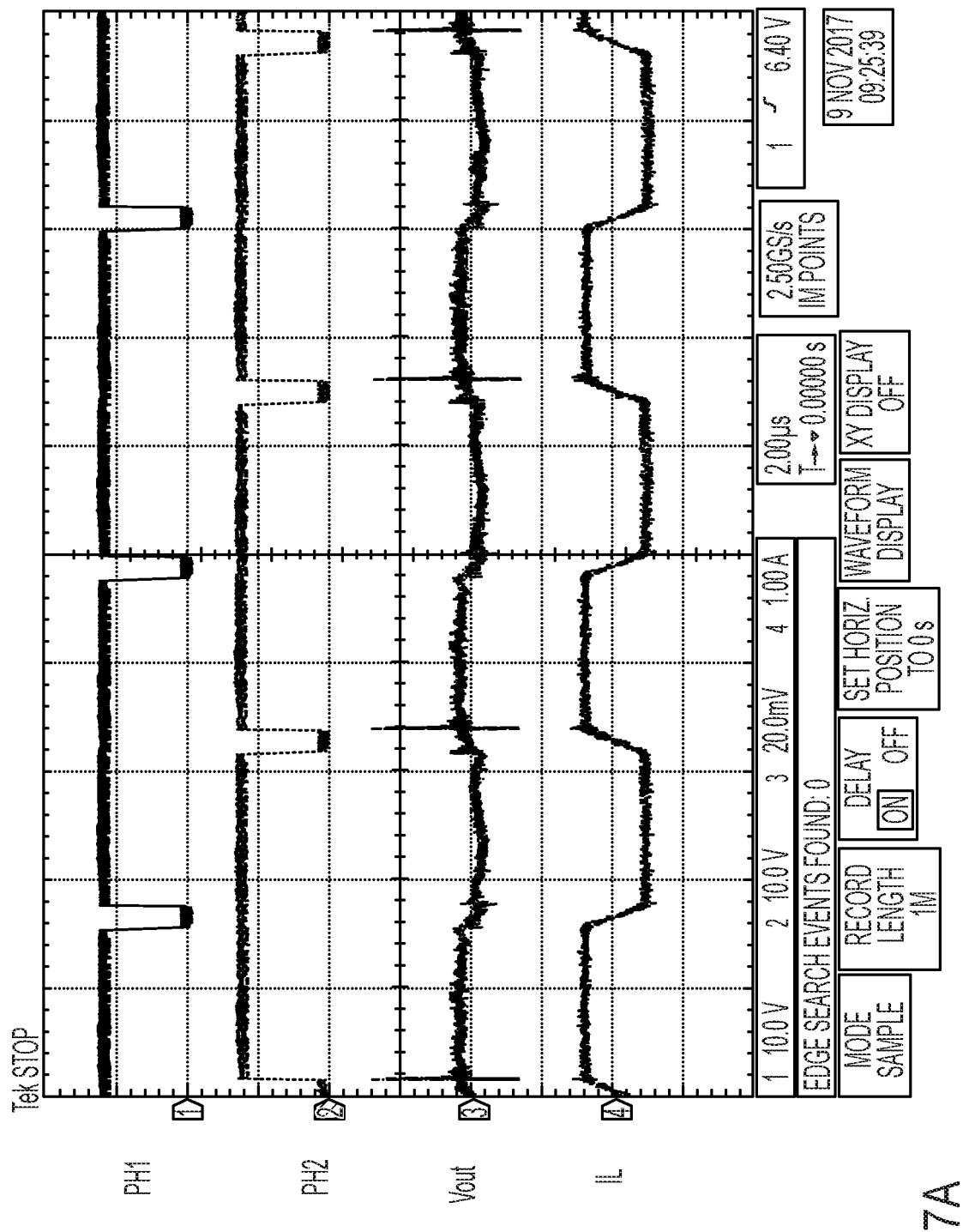
FIGS. 7A-7E illustrate various waveforms of simulation results of the mode transitions, according to some embodiments.
Figure 7B:
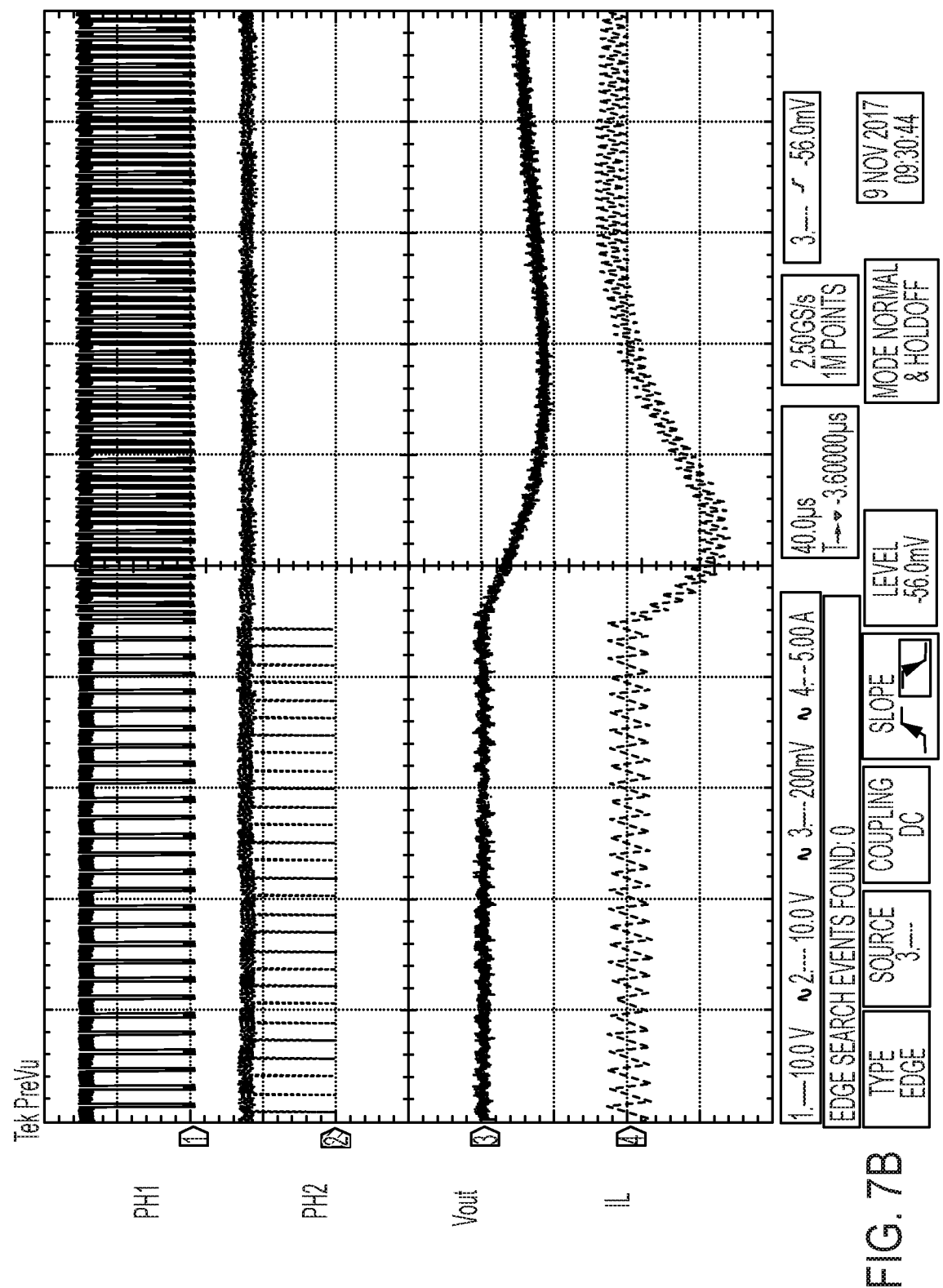
Figure 7C:
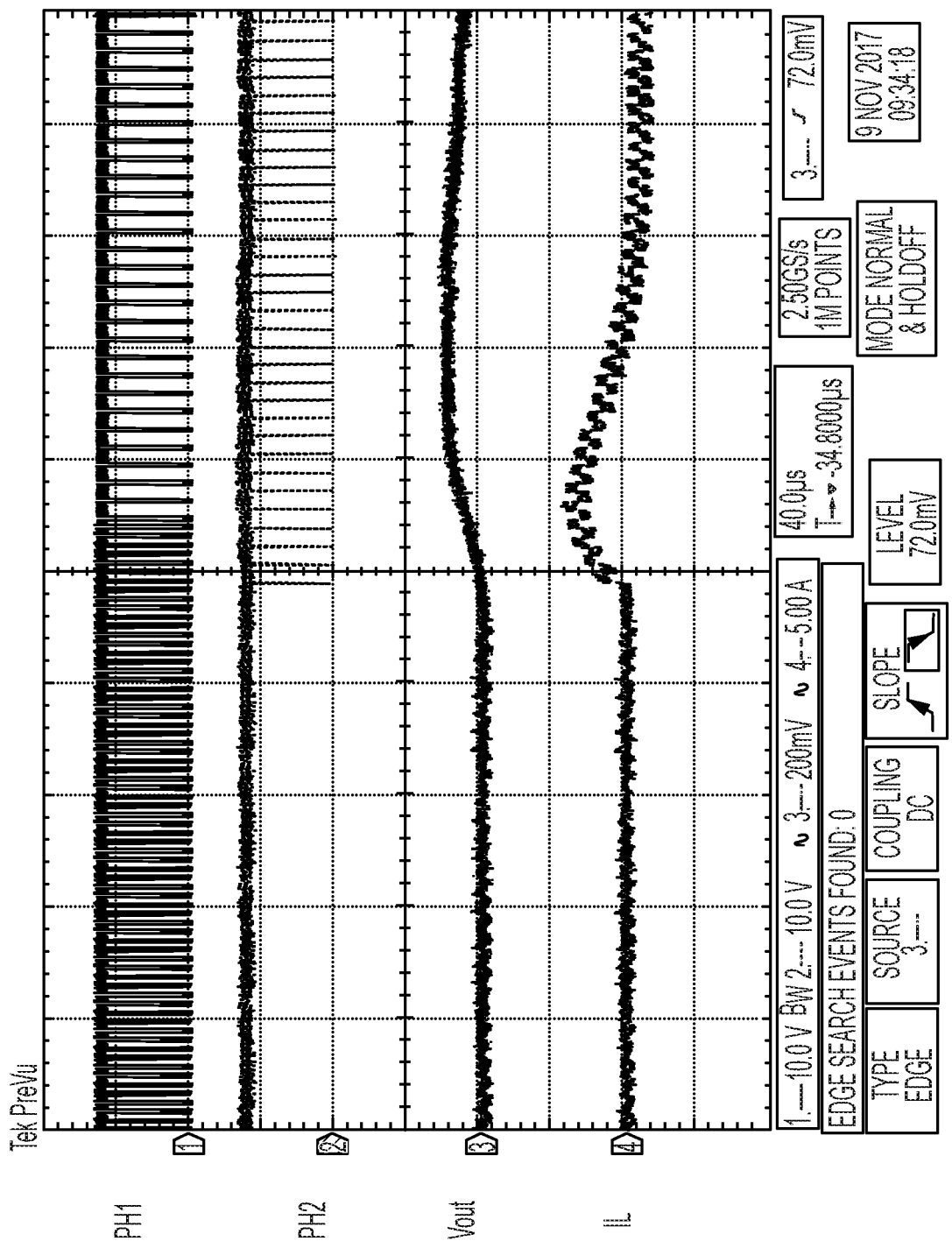
Figure 7D:
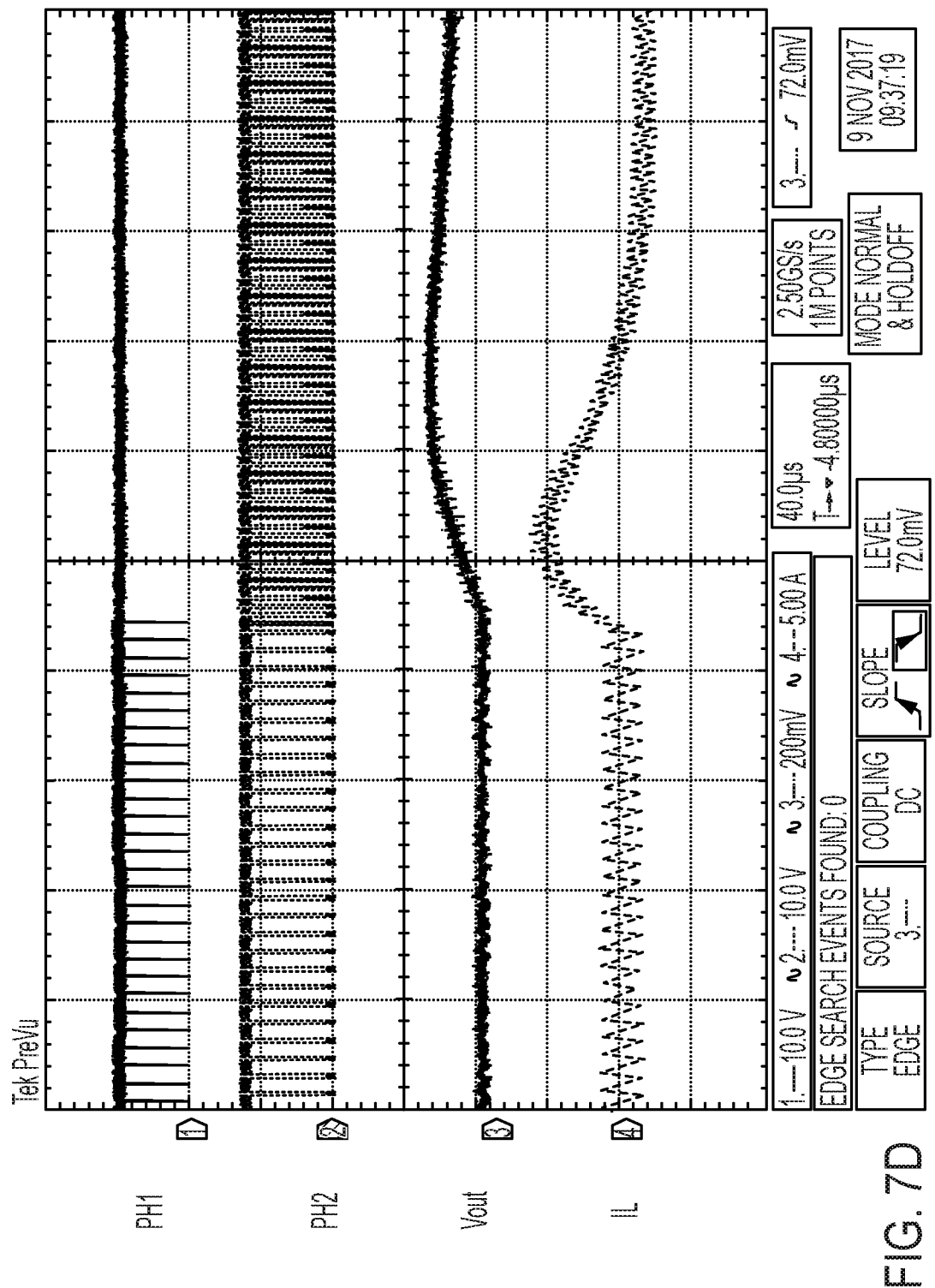
Figure 7E:
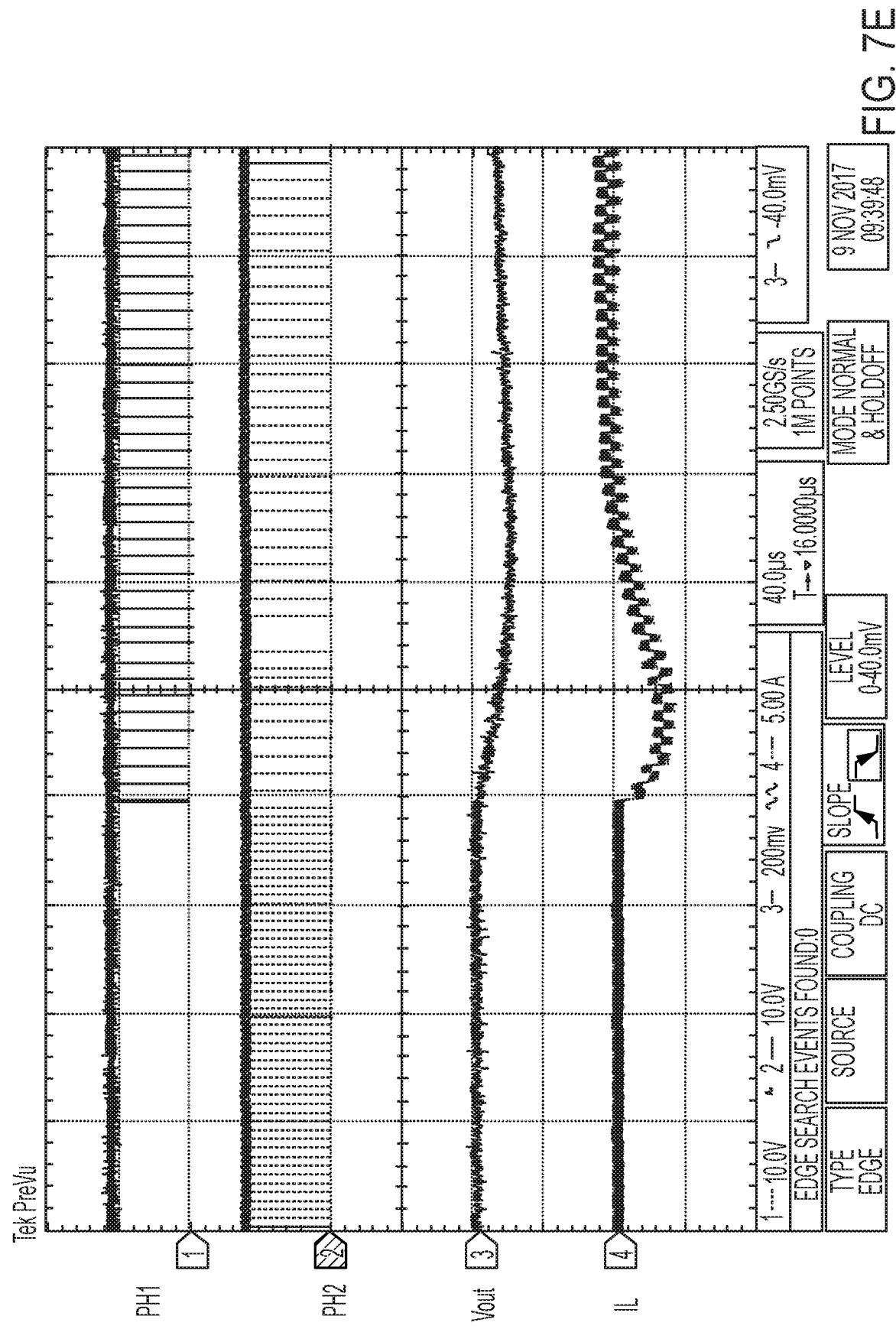

FIGS. 7A-7E show various waveforms showing simulation results of mode transitions, according to some embodiments. FIG. 7A shows a buck-boost mode operation waveform. FIG. 7B shows a buck-boost mode to buck mode transition operation waveform. FIG. 7C shows a buck mode to buck-boost mode transition operation waveform. FIG. 7D shows a buck-boost mode to boost mode transition operation waveform. FIG. 7E shows a boost mode to buck-boost mode transition operation waveform. The waveforms shown in FIGS. 7A-7E show a node voltage at the node (PH1) 310, a node voltage at the node (PH2) 318, the output voltage VOUT, and the inductor current $I_L$ across the inductor (L) 316. As shown in FIGS. 7A-7E, operating the buck boost converter 302 based on the hysteresis mode transition scheme according to embodiments described herein results in a clean mode transition between each of the modes (e.g., buck, buck-boost, and boost modes), and reduces (or avoids) chattering during the transition. Further, ripples in the low frequency output voltage VOUT and the inductor current $I_L$ are reduced, and ripple noise in the output voltage VOUT and variations during the transitions are reduced.

It will be appreciated by those skilled in the art having the benefit of this disclosure that this buck boost voltage converter provides for improved operation when transitioning between buck mode, buck-boost mode, and boost mode of operations. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope of the present disclosure, as defined by the following claims, and their equivalents. Thus, it is intended that the following claims be interpreted to embrace all such further modifications, changes, rearrangements, substitutions, alternatives, design choices, embodiments, and equivalents thereof.

What is claimed is:

1. A converter, comprising:
 a buck boost converter circuit configured to generate an output voltage in response to an input voltage, the buck boost converter circuit comprising:
  an upper buck transistor coupled to an input voltage node, the input voltage node configured to receive the input voltage;
  an upper boost transistor coupled to an output voltage node, the output voltage node configured to output the output voltage; and
  an inductor coupled between the upper buck transistor and the upper boost transistor; and
 a mode control logic circuit configured to generate a mode control signal to control an operation mode of the buck boost converter circuit to operate in one of a buck mode, a boost mode, and a buck-boost mode,
 wherein the mode control signal is generated based on a first duty cycle of the upper buck transistor and a second duty cycle of the upper boost transistor.

2. The converter of claim 1, further comprising:
 a buck mode control logic driver configured to generate a first gate control signal for the upper buck transistor responsive to the mode control signal; and
 a boost mode control logic driver configured to generate a second gate control signal for the upper boost transistor responsive to the mode control signal.

3. The converter of claim 2, further comprising a PWM controller configured to provide a buck PWM control signal to the buck mode control logic driver, and to provide a boost PWM control signal to the boost mode control logic driver.

4. The converter of claim 3, wherein the buck boost converter circuit further comprises:
 a lower buck transistor coupled between the upper buck transistor and ground; and
 a lower boost transistor coupled between the upper boost transistor and ground,
 wherein, when the buck boost converter circuit is operating in the buck-boost mode:
  the buck mode control logic driver is configured to alternately switch the upper buck transistor and the lower buck transistor on and off, responsive to the mode control signal and the buck PWM control signal; and
  the boost mode control logic driver is configured to alternately switch the upper boost transistor and the lower boost transistor on and off, responsive to the mode control signal and the boost PWM control signal.

5. A converter, comprising:
a buck boost converter circuit configured to generate an output voltage in response to an input voltage, the buck boost converter circuit comprising:
an upper buck transistor coupled to an input voltage node, the input voltage node configured to receive the input voltage;
an upper boost transistor coupled to an output voltage node, the output voltage node configured to output the output voltage; and
an inductor coupled between the upper buck transistor and the upper boost transistor; and
a mode control logic circuit configured to generate a mode control signal to control an operation mode of the buck boost converter circuit to operate in one of a buck mode, a boost mode, and a buck-boost mode,
wherein the mode control signal is generated based on a first duty cycle of the upper buck transistor and a second duty cycle of the upper boost transistor, and
wherein the mode control logic circuit is configured to compare the first duty cycle of the upper buck transistor with a first transition time duty cycle when the buck boost converter circuit is operating in the buck mode.

6. The converter of claim 5, wherein the mode control logic circuit is configured to generate the mode control signal to switch the operation mode of the buck boost converter circuit from the buck mode to a boost cycle within the buck-boost mode in response to the first duty cycle of the upper buck transistor exceeding the first transition time duty cycle.

7. The converter of claim 6, wherein the mode control logic circuit is configured to compare the second duty cycle of the upper boost transistor with a second transition time duty cycle in response to the buck boost converter circuit operating in the boost cycle within the buck-boost mode, the second transition time duty cycle being less than the first transition time duty cycle.

8. The converter of claim 7, wherein the mode control logic circuit is configured to generate the mode control signal to switch the operation mode of the buck boost converter circuit from the boost cycle within the buck-boost mode to a buck cycle within the buck-boost mode in response to the second duty cycle of the upper boost transistor being greater than the second transition time duty cycle.

9. The converter of claim 7, wherein the mode control logic circuit is configured to generate the mode control signal to switch the operation mode of the buck boost converter circuit from the buck-boost mode to the boost mode after executing at least two consecutive boost cycles in response to the second duty cycle of the upper boost transistor being less than the second transition time duty cycle.

10. The converter of claim 9, wherein the mode control logic circuit is configured to compare the second duty cycle of the upper boost transistor with the first transition time duty cycle when the buck boost converter circuit is operating in the boost mode.

11. A method of driving a converter, the converter comprising:
a buck boost converter circuit configured to generate an output voltage in response to an input voltage, the buck boost converter circuit comprising:
an upper buck transistor coupled to an input voltage node, the input voltage node configured to receive the input voltage;
an upper boost transistor coupled to an output voltage node, the output voltage node configured to output the output voltage; and
an inductor coupled between the upper buck transistor and the upper boost transistor; and
a mode control logic circuit configured to generate a mode control signal to control an operation mode of the buck boost converter circuit to operate in one of a buck mode, a boost mode, and a buck-boost mode;
the method comprising:
comparing, by the mode control logic circuit, a first duty cycle of the upper buck transistor with a first transition time duty cycle when the buck boost converter circuit is operating in the buck mode;
comparing, by the mode control logic circuit, a second duty cycle of the upper boost transistor with the first transition time duty cycle when the buck boost converter circuit is operating in the boost mode; and
comparing, by the mode control logic circuit, the first duty cycle of the upper buck transistor and the second duty cycle of the upper boost transistor with a second transition time duty cycle when the buck boost converter circuit is operating in the buck-boost mode, the second transition time duty cycle being less than the first transition time duty cycle.

12. The method of claim 11, further comprising: generating, by the mode control logic circuit, the mode control signal to switch the operation mode of the buck boost converter circuit from the buck mode to a boost cycle within the buck-boost mode in response to the first duty cycle of the upper buck transistor exceeding the first transition time duty cycle.

13. The method of claim 12, further comprising: comparing, by the mode control logic circuit, the second duty cycle of the upper boost transistor with the second transition time duty cycle in response to the buck boost converter circuit operating in the boost cycle within the buck-boost mode.

14. The method of claim 13, further comprising: generating, by the mode control logic circuit, the mode control signal to switch the operation mode of the buck boost converter circuit from the boost cycle within the buck-boost mode to a buck cycle within the buck-boost mode in response to the second duty cycle of the upper boost transistor being greater than the second transition time duty cycle.

15. The method of claim 14, further comprising:
executing, by the buck boost converter circuit, at least two consecutive boost cycles in response to the second duty cycle of the upper boost transistor being less than the second transition time duty cycle; and
generating, by the mode control logic circuit, the mode control signal to switch the operation mode of the buck boost converter circuit from the buck-boost mode to the boost mode after the at least two consecutive boost cycles are executed.

16. The method of claim 11, further comprising: generating, by the mode control logic circuit, the mode control signal to switch the operation mode of the buck boost converter circuit from the boost mode to a buck cycle within the buck-boost mode in response to the second duty cycle of the upper boost transistor exceeding the first transition time duty cycle.

17. The method of claim 16, further comprising: comparing, by the mode control logic circuit, the first duty cycle of the upper buck transistor with the second transition time duty cycle in response to the buck boost converter circuit operating in the buck cycle within the buck-boost mode.

18. The method of claim 17, further comprising: generating, by the mode control logic circuit, the mode control signal to switch the operation mode of the buck boost converter circuit from the buck cycle within the buck-boost mode to a boost cycle within the buck-boost mode in response to the first duty cycle of the upper buck transistor being greater than the second transition time duty cycle.

19. The method of claim 18, further comprising:

executing, by the buck boost converter circuit, at least two consecutive buck cycles in response to the second duty cycle of the upper buck transistor being less than the second transition time duty cycle; and generating, by the mode control logic circuit, the mode control signal to switch the operation mode of the buck boost converter circuit from the buck-boost mode to the buck mode after the at least two consecutive buck cycles are executed.

20. The method of claim 11, further comprising:

generating, by the mode control logic circuit, the mode control signal for the buck-boost mode by outputting the mode control signal corresponding to one cycle of a buck mode alternating with one cycle of a boost mode repeatedly until at least one of the first duty cycle of the upper buck transistor and the second duty cycle of the upper boost transistor decreases below the second transition time duty cycle; and generating, by the mode control logic circuit, the mode control signal for one of the buck mode and the boost mode in response to the first duty cycle of the upper buck transistor or the second duty cycle of the upper boost transistor being decreased below the second transition time duty cycle.

\* \* \* \* \*